United States Patent
Huynh et al.

(10) Patent No.: US 6,229,668 B1
(45) Date of Patent: May 8, 2001

(54) ACOUSTIC PLUG FOR A HARD DISK DRIVE

(75) Inventors: Duane Huynh; Tu Nguyen, both of San Jose; Kevin Vu, Santa Clara, all of CA (US)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/118,592

(22) Filed: Jul. 17, 1998

(51) Int. Cl.[7] ............................ G11B 33/08; G11B 23/03
(52) U.S. Cl. ................................. 360/97.01; 369/263
(58) Field of Search ...................... 360/97.01, 97.02, 360/97.03; 369/75.1, 263; 310/51

(56) References Cited

U.S. PATENT DOCUMENTS 5,214,549 * 5/1993 Baker et al. ...................... 360/97.02
5,875,067 * 2/1999 Morris et al. ...................... 360/97.01

* cited by examiner

Primary Examiner—George J. Letscher
(74) Attorney, Agent, or Firm—Irell & Manella, LLP; Jeffrey Aiello

(57) ABSTRACT

An acoustic plug for an acoustic plate that is attached to a cover of a hard disk drive. The hard disk drive includes a disk that is attached to a spin motor. The spin motor is attached to a base plate of the disk drive. An actuator arm assembly is also mounted to the base plate. The cover encloses the spin motor, disk and actuator arm assembly. The drive also has at least one fastener that extends through the cover. The fastener(s) can be attached to the spin motor and/or the actuator arm assembly. The acoustic plate has an opening that is located adjacent to the fastener. The acoustic plug is located within the acoustic plate opening.

8 Claims, 1 Drawing Sheet

ACOUSTIC PLUG FOR A HARD DISK DRIVE

BACKGROUND OF THE INVENTION

1. Field of the Invention

The present invention relates to an acoustic plug for a hard disk drive.

2. Background Information

Hard disk drives contain a number of magnetic recording heads that are located adjacent to a plurality of rotating magnetic disks. The disks are attached to a spin motor that is mounted to a base plate of the disk drive. Each recording head is mounted to a flexure arm. The flexure arms are attached to an actuator arm which has a voice coil motor. The voice coil motor can rotate the actuator arm and move the heads across the surfaces of the disks. The actuator arm is pivotally connected to the base plate of the disk drive. To prevent contamination of the magnetic disks, the drives typically have a cover which encloses the actuator arm assembly, spin motor and disks. The spin motor and actuator arm assembly are typically secured to the base plate by fasteners that extend through the cover.

The rotation of the disks and the movement of the actuator arm create audible frequencies which are transmitted through the cover and emitted from the hard disk drive. The sound of a disk drive can be an annoyance to an end user. Some disk drives incorporate acoustic damping features to attenuate the noise created by the spin motor and the actuator arm assembly. For example, some disk drives include an acoustic plate that is attached to the top surface of the cover. The acoustic plate is bonded to the cover by a damping adhesive that absorbs acoustic energy.

The acoustic plates have openings which provide access to the fasteners so that the disk drive can be disassembled. The openings are adjacent to the spin motor and the actuator arm assembly. It has been found that a significant amount of noise is still transmitted through the openings from the spin motor and the actuator arm assembly. It would be desirable to reduce the acoustic emissions of prior art hard disk drives.

SUMMARY OF THE INVENTION

The present invention is an acoustic plug for an acoustic plate that is attached to a cover of a hard disk drive. The hard disk drive includes a disk that is attached to a spin motor. The spin motor is attached to a base plate of the disk drive. An actuator arm assembly is also mounted to the base plate. The cover encloses the spin motor, disk and actuator arm assembly. The drive also has at least one fastener that extends through the cover. The fastener(s) can be attached to the spin motor and/or the actuator arm assembly. The acoustic plate has an opening that is located adjacent to the fastener. The acoustic plug is located within the acoustic plate opening.

DETAILED DESCRIPTION OF THE INVENTION

One embodiment of the present invention includes a pair of acoustic plugs for an acoustic plate that is attached to a cover of a hard disk drive. The hard disk drive includes a disk that is attached to a spin motor. The spin motor is attached to a base plate of the disk drive. An actuator arm assembly is also mounted to the base plate. The cover encloses the spin motor, disk and actuator arm assembly. The drive also has a pair of fasteners that extend through the cover. The fasteners attach the spin motor and the actuator arm assembly to the base plate. The acoustic plate has a pair of openings that provide access to the fasteners. The acoustic plugs are located within the acoustic plate openings. The plugs and the plate both attenuate any acoustic energy that is transmitted to the top surface of the cover.

Figure 1:
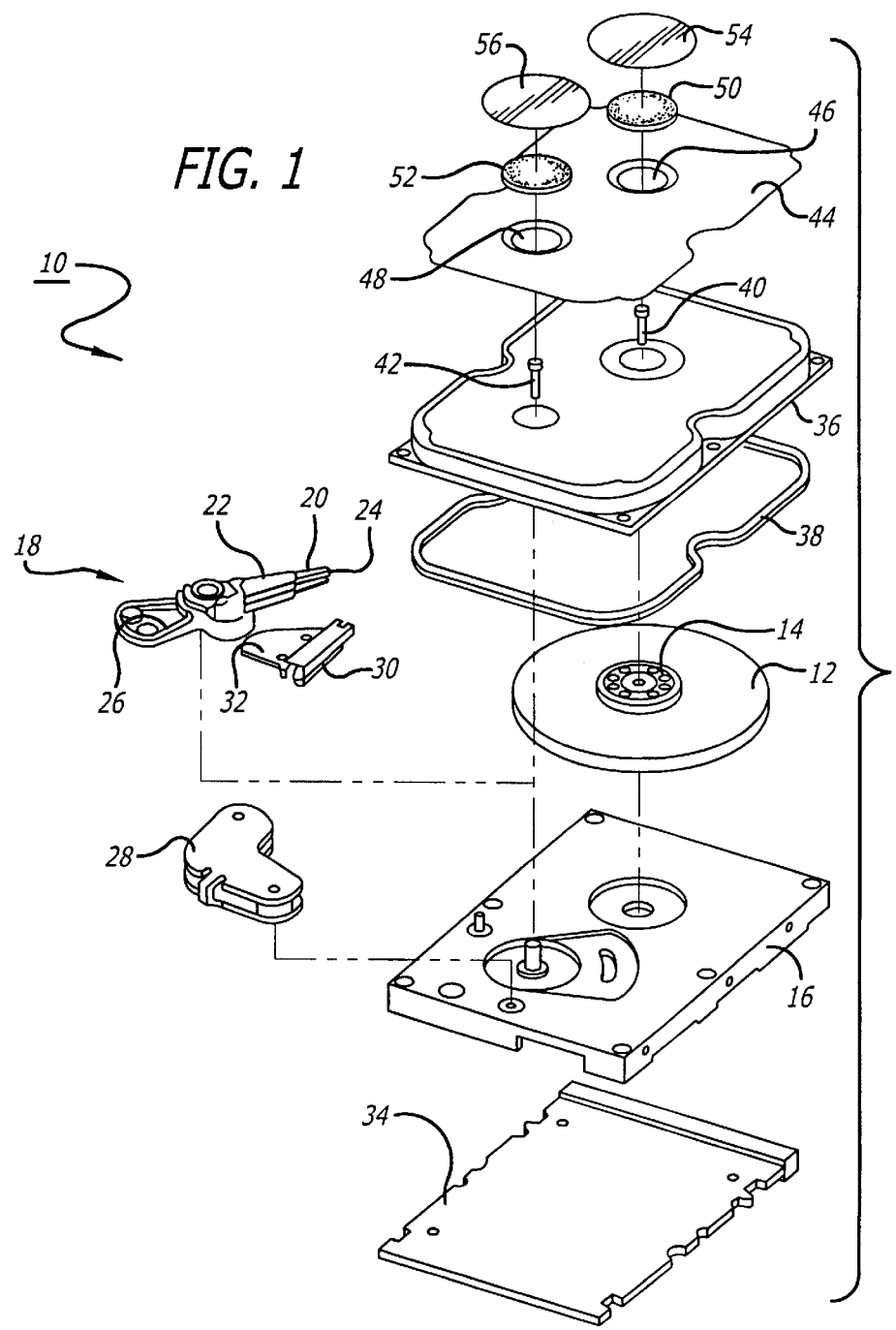
FIG. 1 is a perspective view of a hard disk drive of the present invention.

Referring to the drawings more particularly by reference numbers, FIG. 1 shows a hard disk drive 10 of the present invention. The disk drive 10 includes a plurality of magnetic disks 12 that are attached to a spin motor 14. The spin motor 14 is mounted to a base plate 16. The spin motor 14 rotates the disks 12.

The disk drive 10 also contains an actuator arm assembly 18. The assembly 18 includes a plurality of flexure arms 20 that are attached to an actuator arm 22. Magnetic recording heads 24 are mounted to the end of each flexure arm 20. In operation, the recording heads 24 "fly" adjacent to the rotating magnetic disks 12 and either magnetize or sense the magnetic field of the disks 12 as is known in the art.

The assembly 18 may further include a coil 26 that is attached to the actuator arm 22. The coil 26 may be coupled to a magnet assembly 28 that is mounted to the base plate 16. The coil 26 and magnet assembly 28 create a voice coil motor which can rotate the arm 22 and move the heads 24 across the surfaces of the disks 12.

The heads 24 are typically coupled to a connector 30 by a flexible circuit board 32. The connector 30 is mounted to the base plate 16 and plugged into a mating connector (not shown) of a printed circuit board assembly 34. The printed circuit board assembly 34 contains integrated circuits (not shown) that operate the hard disk drive.

The disks 12, spin motor 14 and actuator arm assembly 18 are enclosed by a cover 36 that is attached to the base plate 16. The cover 36 may be sealed to the base plate 16 by an 0-ring 38. The disk drive 10 may include a first fastener 40 that extends through the cover 36 and attaches the spin motor 14 to the base plate 16. The drive 10 may also have a second fastener 42 that extends through the cover 36 and attaches the actuator arm assembly 18 to the base plate 16.

The disk drive 10 includes an acoustic plate 44 that is attached to the top surface of the cover 36. The acoustic plate 44 may include a damping adhesive that is coated onto a steel plate. The damping adhesive attaches the metal plate to the cover 36. The damping adhesive attenuates acoustic energy transmitted into the cover 36. The acoustic plate 44 has a first opening 46 that is located adjacent to the first fastener 40 and a second opening 48 that is located adjacent to the second fastener 42.

The disk drive 10 includes a first acoustic plug 50 that is inserted into the first opening 46 and a second acoustic plug 52 that is inserted into the second opening 48. The plugs 50 and 52 are constructed from a material that will attenuate acoustic energy that is transmitted into the openings 46 and 48. By way of example, the plugs 50 and 52 may be constructed from a foam material.

The first plug 50 may be covered by a first label 54. The second plug 52 may be covered by a second label 56. The labels 54 and 56 may have a layer of damping adhesive that also attenuate acoustic energy. It has been found that the plugs 50 and 52 and the labels 54 and 56 can reduce noise emission from the disk drive by 5 to 6 decibels.

Figure 2:
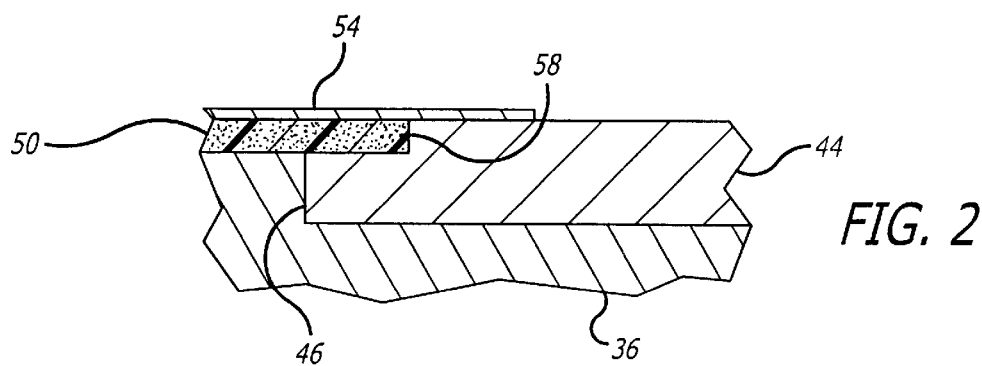
FIG. 2 is an enlarged sectional view of a cover of the disk drive.

As shown in FIG. 2, the acoustic plate 44 may have an annular lip 58 that allows the plug 50 to lie flush with the top surface of the plate 44. Plug 52 may also lie within an annular lip of the plate 44.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive assembly, comprising:

a base plate;

a spin motor mounted to said baseplate;

a disk attached to said spin motor;

an actuator arm assembly mounted to said base plate;

a cover that encloses said spin motor, said disk and said actuator arm assembly;

a fastener that extends through said cover;

an acoustic plate that is attached to said cover, said acoustic plate having an opening that is adjacent to said fastener; an acoustic plug that is located within said opening; and, a label that covers, and is contiguous with said acoustic plug said label having a layer of damping adhesive which attenuates acoustic energy.

2. The assembly as recited in claim 1, wherein said acoustic plug is constructed from a foam material.

3. The assembly as recited in claim 1, wherein said fastener is attached to said spin motor.

4. The assembly as recited in claim 1, wherein said fastener is attached to said actuator arm assembly.

5. The assembly as recited in claim 1, wherein said acoustic plate includes a metal plate that has a layer of damping adhesive.

6. A hard disk drive assembly, comprising:

a base plate;

a spin motor mounted to said baseplate;

a disk attached to said spin motor;

an actuator arm assembly mounted to said base plate;

a cover that encloses said spin motor, said disk and said actuator arm assembly;

a first fastener that extends through said cover and attaches said spin motor to said base plate;

a second fastener that extends through said cover and attaches said actuator arm assembly to said base plate;

an acoustic plate that is attached to said cover, said acoustic plate having a first opening that is adjacent to said first fastener and a second opening that is adjacent to said second fastener;

a first acoustic plug located within said first cover opening;

a second acoustic plug located within said second cover openings;

a first label that covers and is contiguous with said first acoustic plug; and a second label that covers and is contiguous with said second acoustic plug said first and second labels each having a layer of damping adhesive which attenuates acoustic energy.

7. The assembly as recited in claim 6, wherein said first and second acoustic plugs are constructed from a foam material.

8. The assembly as recited in claim 6, wherein said acoustic plate includes a metal plate that has a layer of damping adhesive.

* * * * *